United States Patent [19]
Francis

[11] 3,787,075
[45] Jan. 22, 1974

[54] STEERING WHEEL AND COLUMN INTERFACE SEAL

[75] Inventor: Philip L. Francis, Rochester, Mich.

[73] Assignee: General Motors Corporation, Detroit, Mich.

[22] Filed: Oct. 30, 1972

[21] Appl. No.: 302,043

[52] U.S. Cl. ............... 280/150 AB, 137/68, 141/31, 222/491, 285/9 R, 137/521.1
[51] Int. Cl. .............................................. B60r 21/08
[58] Field of Search 280/150 AB, 87 R; 137/68, 69, 137/70, 71, 521.1; 222/491, 492, 493, 83, 83.5; 285/9 R

[56] References Cited
UNITED STATES PATENTS

| | | | |
|---|---|---|---|
| 3,580,603 | 5/1971 | Chute | 280/150 AB |
| 3,680,884 | 8/1972 | Stephenson | 280/150 AB |
| 2,897,835 | 8/1959 | Philippe | 137/525.1 |
| 3,191,533 | 6/1965 | Hopson | 137/68 |
| 3,072,304 | 1/1963 | Junaid | 222/493 |
| 2,500,404 | 3/1950 | Donnelly | 285/9 R |

FOREIGN PATENTS OR APPLICATIONS

| | | | |
|---|---|---|---|
| 609,624 | 9/1960 | Italy | 280/150 AB |
| 882,022 | 5/1953 | Germany | 285/9 R |
| 916,742 | 1/1963 | Great Britain | 285/9 R |

Primary Examiner—Kenneth H. Betts
Assistant Examiner—John P. Silverstrim
Attorney, Agent, or Firm—Herbert Furman

[57] ABSTRACT

The housing at the upper end of a motor vehicle steering column includes radially spaced inner and outer walls which define a plenum communicating with an inflator. An interface seal is mounted in the plenum at its end portion adjacent the steering wheel and includes an annular rubber seal or channel cross section having received therein an annular reinforcement and being located in axially spaced relation from the end wall of the steering wheel to permit frictionless rotation of the steering wheel relative the housing. Upon communication of pressure fluid to the plenum, the interface seal is slidably moved axially into engagement with the end wall of the steering wheel. The reinforcement of the interface seal has circumferentially spaced curved slots which register with circumferentially spaced apertures in the end wall of the steering wheel. Upon pressure build up within the annular passage, the bight of the annular rubber seal is ruptured at its portions which are in registering relationship with the curved slots of the reinforcement and the apertures of the steering wheel end wall to communicate the pressure fluid from the plenum to an inflatable occupant restraint cushion on the steering wheel.

5 Claims, 5 Drawing Figures

PATENTED JAN 22 1974 3,787,075

STEERING WHEEL AND COLUMN INTERFACE SEAL

The invention relates to an inflatable occupant restraint system and more particularly to an interface seal for effecting communication between a stationary steering column assembly and a rotatable steering wheel mounted occupant restraint cushion.

It is known to mount inflatable occupant restraint cushions on steering wheels. It is also known to mount an inflator on the steering wheel or on the steering column and directly communicate such inflator with the cushion for inflation thereof.

Furthermore, it is known to communicate the pressurized gas to the stationary upper housing of the steering column assembly and to provide a seal between the housing and the rotatable steering wheel to effect communication of the gas to the steering wheel mounted occupant restraint cushion.

The present invention provides an improved frictionless and non-wearing seal for the interface between the stationary steering column assembly and the rotatable steering wheel.

According to the invention, the housing at the upper end of the steering column includes inner and outer walls which define an annular passage or plenum in communication with a source of pressure fluid or inflator. An annular interface seal is located in the plenum at its end portion adjacent the steering wheel. The annular interface seal includes an annular rubber seal of channel cross section having its inner and outer diametrical legs respectively sealingly engaging the inner and outer walls of the housing. An annular reinforcement, also of channel cross section, is received within the annular rubber seal and has circumferentially spaced curved slots in the bight thereof. A steering wheel is rotatably mounted on the steering column housing and has a spider having an end wall in which there are a plurality of circumferentially spaced apertures opening to the interior of a steering wheel mounted inflatable occupant restraint cushion. The bight of the annular rubber seal is axially spaced from the end wall of the steering wheel spider to permit frictionless rotation of the steering wheel relative the housing. Upon actuation of the inflator by a sensor, pressure fluid is communicated to the plenum and slidably moves the interface seal axially until the bight of the annular rubber seal engages the end wall of the steering wheel spider. Upon predetermined pressure build up within the annular passage, the bight of the annular seal is ruptured at its portions which are in registering relationship with the curved slots of the reinforcement and the apertures of the steering wheel spider to communicate the pressure fluid from the housing to the occupant restraint cushion.

One feature of the invention is the provision of a frictionless interface seal between relatively rotatable members.

Another feature of the invention is an interface seal between relatively rotatable members in which the seal is slidably mounted in a plenum of one of the members and moves axially into sealing engagement of the other member is response to pressure fluid communicated thereto.

Yet another feature of the invention is an interface seal between relative rotatable members which is slidably mounted in an annular passage of one of the members and is moved by pressure fluid axially into engagement with the other member and then ruptured to communicate pressure fluid through registering passages of the relatively rotatable members.

These and other features, objects and advantages of the invention will become apparent upon consideration of the specification and the appended drawings in which.

Figure 1:
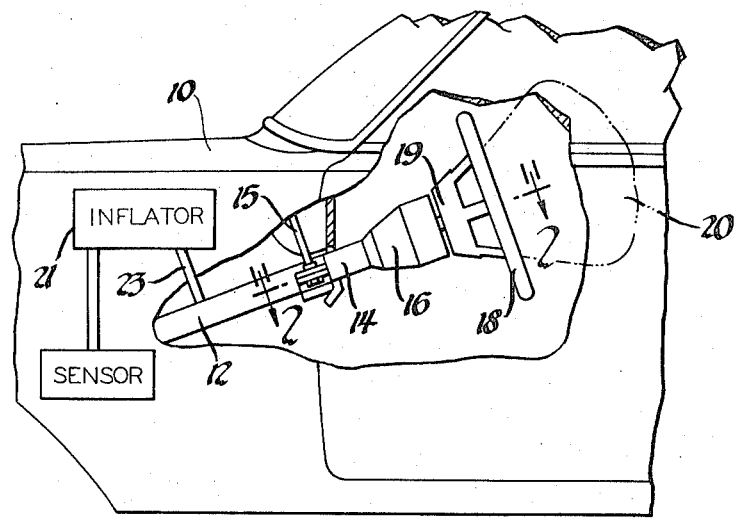
FIG. 1 is a side elevation view of a motor vehicle embodying the invention and having parts broken away and in section.

Referring to FIG. 1, a motor vehicle 10 includes a steering column 12 having a mast jacket 14 conventionally non-rotatably supported from the vehicle body 10 by a support structure 15. Steering column 12 also has an upper housing 16 attached to the mast jacket 14 and rotatably journaling a rotatable steering shaft which extends through steering column 12 to a steering wheel assembly 18 having a spider 19. An inflatable occupant restraint cushion 20, shown in phantom lines in FIG. 1 in inflated position, is mounted on the steering wheel 18 for restraining the driver. Sensor actuated inflator 21, such as a gas generator, is mounted on the motor vehicle 10 and communicated to the cushion 20 through housing 16, the mast jacket 14 of the steering column 12 and a conduit 23 as will be further explained hereinafter.

Figure 2:
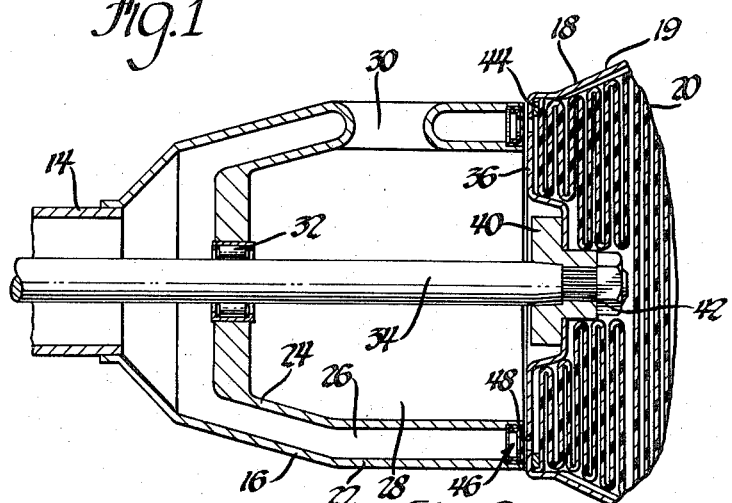
FIG. 2 is an enlarged sectional view taken in the direction of arrows 2—2 of FIG. 1.

Referring to FIG. 2 the steering column housing 16 and steering wheel assembly 18 are shown in enlarged sectional view. The housing 16 is preferably a casting and is secured to the upper end of the mast jacket 14. The housing 16 includes a radially outer wall 22 and a radially inner wall 24 providing therebetween an annular passage or plenum 26. The inner wall 24 defines a chamber 28 within the housing 16 which houses a conventional turn signal switch, not shown. A circular opening 30 through the walls 22 and 24 of the housing 16 is provided for the turn signal switch handle.

A bearing 32 is mounted in a radially extending flange of inner wall 24 and journals the steering shaft 34 for rotation relative to housing 16. The cup shaped hub portion of the spider 19 of steering wheel 18 includes a radially extending end wall 36 having an offset apertured flange welded to an internally splined nut 40. The nut 40 is received on a splined end portion of the steering shaft 34 and retained by a nut 42 threaded on the threaded end of the shaft. The uninflated restraint cushion 20 is folded within the hub portion of the spider 19 and has its lower open end attached thereto in any conventional manner, such as by a split ring 44. A releasable cover, not shown, covers the restraint cushion 20 when it is uninflated. An interface seal, generally indicated at 46, is mounted on the housing 16 and effects communication of pressure fluid from housing 16 to cushion 20, as will be more fully described hereinafter, to inflate cushion 20 and deplay the cushion rearwardly to its dash line position for use by the driver of the vehicle.

Figure 3:
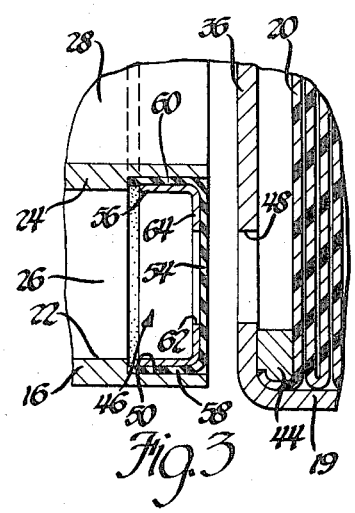
FIG. 3 is an enlarged fragmentary view of FIG. 2.
Figure 5:
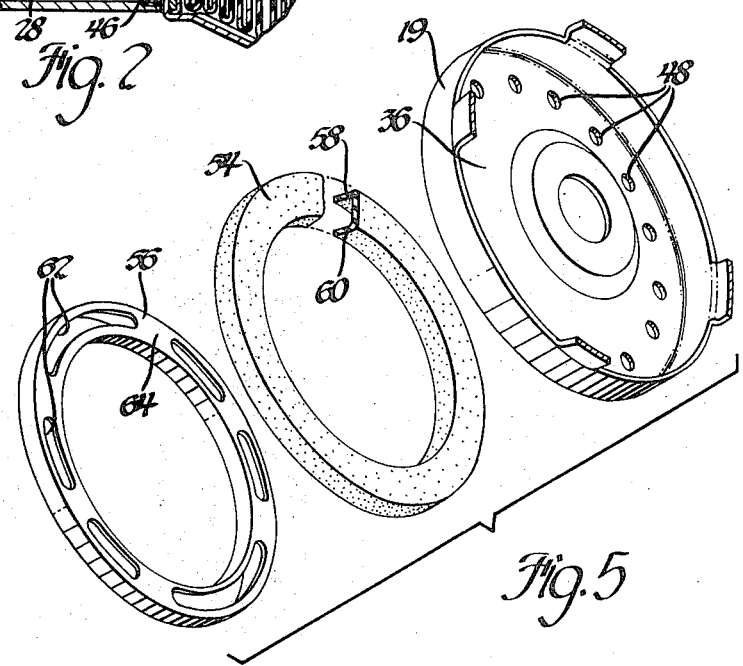
FIG. 5 is an exploded view of the interface seal of the invention.

Referring to FIGS. 3 and 5, it will be seen that the end wall 36 of the steering wheel spider 19 has a plurality of circumferentially spaced apertures 48 therein.

The outer wall 22 and inner wall 24 of housing 16 are milled at the upper end of plenum 26 to define a stepped circular passage 50. The interface seal 46 includes a cylindrical continuous seal 54 of rubber or similar material and of channel cross section which a cylindrical continuous reinforcement 56, also of channel cross section, fits within the seal 54 and biases the legs 58 and 60 of the seal against the walls of the passage 50. A plurality of circumferentially spaced curved slots 62 are provided in the bight 64 of the reinforcement 56. The slots 62 align axially with the majority of the openings 40 at any rotational position of the steering wheel with respect to the housing 16.

Figure 4:
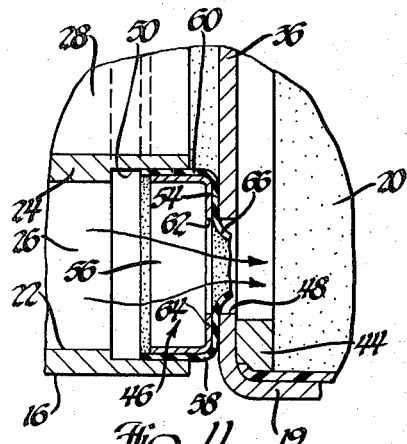
FIG. 4 is a view similar to FIG. 3 showing the seal in pressure fluid communicating position.

A conventional vehicle deceleration sensor, FIG. 1, actuates the inflator 21 when the vehicle 10 is subjected to a predetermined deceleration rate due to impact with an obstacle. Pressure fluid released from the inflator 21 flows through conduit 23 and mast jacket 14 to the plenum 26 of the steering column housing 16. The pressure fluid then acts against the bight 64 of reinforcement 56 and forcibly slides the reinforcement and seal 54 axially of passage 50 and into sealing engagement with the steering wheel end wall 36 as shown in FIG. 4. The pressure fluid causes the seal 54 to rupture at those circumferential portions 66 thereof which register with the slots 62 of the reinforcement 56 and the apertures 48 of the steering wheel end wall 36. Upon such rupture the pressure fluid flows through slots 62 and apertures 48 and into the cushion 20 to inflate the cushion and deplay it to its dash line position shown in FIG. 1 for use by the driver.

It will be understood that the annular seal 54 may be constructed of any material which ruptures under pressure and that the entire interface seal 46 may be constructed of such material.

Thus it is seen that the invention provides an improved interface seal between the stationary steering column assembly and the rotatably mounted steering wheel.

What is claimed is:

1. An occupant restraint system for a motor vehicle comprising, in combination, a steering column assembly including a housing defining a plenum having an open end, seal means of pressure rupturable material slideably mounted in and closing the open end of the plenum, a steering wheel mounted rotatably on the steering column assembly and having a wall axially spaced from the seal means and provided with a plurality of openings aligned with the open end of the plenum, an inflatable occupant restraint cushion mounted on the steering wheel and communicating thereof with the openings in the steering wheel wall, and a source of pressure fluid communicable with the plenum, the pressure fluid moving the seal means into sealing engagement with the wall of the steering wheel and rupturing the seal means at the portions thereof in registering relation with the openings of the wall to communicate pressure fluid to the cushion for inflation thereof.

2. An occupant restraint system for a motor vehicle comprising, in combination, a steering column assembly including a housing defining a plenum having an open end, seal means slideably mounted in and closing the open end of the plenum the seal means having a bight of pressure rupturable material, a steering wheel mounted rotatably on the steering column assembly and having a wall axially spaced from the bight of the seal means and provided with a plurality of openings aligned with the open end of the plenum, an inflatable occupant restraint cushion mounted on the steering wheel and communicating thereof with the openings in the steering wheel wall, and a source of pressure fluid communicable with the plenum, the pressure fluid moving the bight of the seal means into sealing engagement with the wall of the steering wheel and rupturing the bight of the seal means at the portions thereof in registering relation with the openings of the wall to communicate pressure fluid to the cushion for inflation thereof.

3. An occupant restraint system for a motor vehicle comprising in combination a steering column assembly, a steering wheel rotatably mounted on a steering column assembly, a housing on the steering column assembly having radially spaced inner and outer walls defining an annular plenum opening to and in concentric axial relationship with the steering wheel, seal means of pressure rupturable material slideably mounted in and closing the open end of the plenum, the steering wheel including a wall axially spaced from the seal means and having a plurality of openings spaced circumferentially about the axis of rotation and in alignment with the plenum, an inflatable occupant restraint cushion mounted on the steering wheel and communicating with the wall openings, and a source of pressure fluid effective upon actuation to communicate pressure fluid to the plenum whereby the seal means is sequentially moved axially into engagement with the wall of the steering wheel and ruptured at the portions thereof aligned with the openings to communicate pressure fluid to the ooccupant restraint cushion.

4. An occupant restraint system for a motor vehicle comprising in combination, a steering column assembly, a steering wheel rotatably mounted on a steering column assembly, a housing on the steering column assembly having radially spaced inner and outer walls defining an annular plenum opening to and in concentric axial relationship with the steering wheel, annular means slideably mounted in the open end of the plenum, the annular means having a plurality of circumferentially spaced openings closed by a seal means of pressure rupturable material, the steering wheel including a wall axially spaced from the seal means and having a plurality of openings spaced circumferentially about the axis of rotation and in alignment with the plenum, an inflatable occupant restraint cushion mounted on the steering wheel and communicating with the wall openings, and a source of pressure fluid effective upon actuation to communicate pressure fluid to the plenum whereby the annular means is sequentially moved axially into engagement of the seal means with the wall of the steering wheel and ruptured at the portions of the seal means aligned with the openings to communicate pressure fluid to the occupant restraint cushion.

5. In a motor vehicle, the combination comprising a rotatably stationary steering column including a housing at the upper end thereof having radially spaced inner and outer walls defining an annular plenum, a steering wheel rotatably mounted on the steering column and having a laterally extending end wall spaced axially from the housing to permit unimpeded rotation of the steering wheel, a plurality of circumferentially spaced apertures in the end wall of the steering wheel opening to the annular plenum, an inflatable occupant restraint cushion mounted on the steering wheel, an annular seal means of pressure rupturable material mounted in the annular plenum, the annular seal means being of channel cross section including a bight spaced from the end wall of the steering wheel, and axially extending radially spaced inner and outer legs respectively sealingly slideably engaging the radially spaced inner and outer walls defining the annular plenum, and means actuable to communicate pressure fluid to the annular plenum whereby the annular pressure rupturable seal means is moved axially with the bight of the annular seal means sealingly engaging the end wall of the steering wheel and rupturing at its portions abutting the apertures of the end wall to communicate pressure fluid to the cushion for inflation thereof.

* * * * *